(12) United States Patent
Cho et al.

(10) Patent No.: US 8,062,699 B2
(45) Date of Patent: Nov. 22, 2011

(54) METHOD FOR REPAIRING AGED REINFORCED CONCRETE STRUCTURE USING SURFACE-PENETRATION REINFORCING AGENT

(75) Inventors: Myung Sug Cho, Daejeon (KR); Young Chul Song, Daejeon (KR); Jae Ho Lim, Seoul (KR); Jong Ken Kim, Seoul (KR)

(73) Assignee: Korea Electric Power Corporation, Seoul (KR)

( * ) Notice: Subject to any disclaimer, the term of this patent is extended or adjusted under 35 U.S.C. 154(b) by 1148 days.

(21) Appl. No.: 11/888,129

(22) Filed: Jul. 30, 2007

(65) Prior Publication Data
US 2008/0131594 A1   Jun. 5, 2008

(30) Foreign Application Priority Data
Nov. 30, 2006   (KR) ........................ 10-2006-0120233

(51) Int. Cl.
*B05D 3/00*   (2006.01)
(52) U.S. Cl. ........................ 427/140; 427/403
(58) Field of Classification Search .................. 427/140; 525/477; 528/32; 524/394
See application file for complete search history.

(56) References Cited

U.S. PATENT DOCUMENTS
7,670,421 B2 *   3/2010   Cho et al. .................. 106/287.11

OTHER PUBLICATIONS

Franišković et al.: Protection and Repair of Reinforced Concrete Structures by Means of MCI-Inhibitors and Corrosion Protective Materials; Structural Engineering Conferences International Conference on Bridges, Dubrovnik, Croatia May 21-24, 2006.*
ACI 301-06 (American Concrete Institute) Code Requirements for NuclearSafety-Related Concrete Structures Sep. 2007 Chapter 3.*

* cited by examiner

*Primary Examiner* — Timothy Meeks
*Assistant Examiner* — Irwin D Bailey
(74) *Attorney, Agent, or Firm* — McDermott Will & Emery LLP

(57) ABSTRACT

Disclosed is a surface-penetration reinforcing agent that is used to effectively repair a damaged reinforced concrete structure. The surface-penetration reinforcing agent includes a silicate compound, an acrylate monomer, an amine compound and a silane compound as reactants. Further disclosed is a method for repairing a damaged reinforced concrete structure using the surface-penetration reinforcing agent depending on the aging grade of the reinforced concrete structure. According to the repair method, the surface-penetration reinforcing agent can be used to efficiently repair a damaged reinforced concrete structure depending on the aging grade of the reinforced concrete structure classified by whether or not the reinforcing bars are corroded in damaged portions of the concrete and the degree of carbonation in the concrete.

16 Claims, 2 Drawing Sheets

METHOD FOR REPAIRING AGED REINFORCED CONCRETE STRUCTURE USING SURFACE-PENETRATION REINFORCING AGENT

CROSS-REFERENCE TO RELATED APPLICATIONS

The present application is based on, and claims priority from, Korean Application Number 2006-120233, filed on Nov. 30, 2006, the disclosure of which is incorporated by reference herein in its entirety.

BACKGROUND OF THE INVENTION

1. Field of the Invention

The present invention relates to a surface-penetration reinforcing agent that is used to effectively repair a damaged reinforced concrete structure and a method for repairing a damaged reinforced concrete structure using the surface-penetration reinforcing agent depending on the aging grade of the reinforced concrete structure. More specifically, the present invention relates to a surface-penetration reinforcing agent including a silicate compound, an acrylate monomer, an amine compound and a silane compound as reactants, and a method for efficiently repairing a damaged reinforced concrete structure using the surface-penetration reinforcing agent depending on the aging grade of the reinforced concrete structure classified by whether or not the reinforcing bars are corroded in damaged portions of the concrete and the degree of carbonation in the concrete.

2. Description of the Related Art

Concrete and steel materials are used in almost every construction industry. Concrete has already proved to have superior formability and workability. Further, concrete has proved to be excellent in terms of quality, such as durability and fire resistance. Based on these advantages, concrete structures have been recognized as being semi-permanent. However, concrete is aged and reinforcing bars are corroded with the passage of time, which make the concrete structures less durable. Such drawbacks of concrete structures are issued as serious social problems. Under theses circumstances, there has been an increasing interest in the maintenance and repair of concrete structures to enhance the usability and stability of the concrete structures.

Many methods have been developed to repair damaged reinforced concrete structures. For example, a damaged reinforced concrete structure is repaired through the following the steps: application of a primer to reinforcing bars, filling of cavities formed in the concrete, and top coating of the surface of the filled cavities. The primer used herein is for the purpose of enhancing the adhesion to a repair mortar for filling the cavities formed in the concrete. As the primer, an epoxy resin, an acrylic resin, a polymer-incorporated cement paste or the like is mainly used. The resinous primer is highly adhesive to concrete at the initial stage of the adhesion. However, since the resinous primer exhibits very different thermal behaviors from the concrete, the adhesion of the primer to the concrete is gradually weakened with the passage of time, resulting in falling of the primer from the concrete. Moreover, the resinous primer leaves a film on the surface of the concrete and has a difficulty in penetrating into the concrete. Accordingly, the primer does not substantially contribute to the reinforcement of the concrete.

Further, a top coating agent is used to prevent occurrence of whitening in the concrete and the repair mortar and to inhibit introduction of water, carbon dioxide and chlorides into the concrete from the outside, thus enhancing the durability of the concrete. Examples of such top coating agents include epoxy and urethane materials. The epoxy and urethane materials serve to prevent elution of water-soluble components together with water to the outside and are effective in inhibiting introduction of the aging factors. In the case where water vapor is generated within the concrete due to the difference in humidity between the inside and the outside of the concrete, the coating formed on the concrete is peeled off by the water vapor escaping to the outside of the concrete and the top coating agent becomes loose or falls off. Furthermore, the use of a solvent in the coating agent causes the generation of a highly toxic smell during coating and even poses a risk of explosion, thus making it impossible to guarantee the safety of workers.

Further, when one method is always employed to repair damaged reinforced concrete structures, unnecessary repair working may be performed regardless of the severity of the damage and the degree of corrosion of reinforcing bars may not be sufficiently reflected.

SUMMARY OF THE INVENTION

Thus, the present inventors have earnestly and intensively conducted research to solve the above-mentioned problems. As a result, the present inventors have succeeded in preparing a surface-penetration reinforcing agent based on the principle of a sol-gel process, and have found that the surface-penetration reinforcing agent could be used to effectively repair aged reinforced concrete structures by different methods depending on the aging grade of the reinforced concrete structures. The present invention has been achieved based on this finding.

It is an object of the present invention to provide a method for repairing an aged reinforced concrete structure using a surface-penetration reinforcing agent capable of enhancing the strength of the aged reinforced concrete structure and efficiently blocking the introduction of aging factors into the aged reinforced concrete structure from the outside to prolong the endurance life and service life of the aged reinforced concrete structure.

In accordance with an aspect of the present invention for achieving the above object, there is provided a method for repairing an aged reinforced concrete structure, the method including the step of (a) applying a surface-penetration reinforcing agent including a silicate polymer of Formula 1:

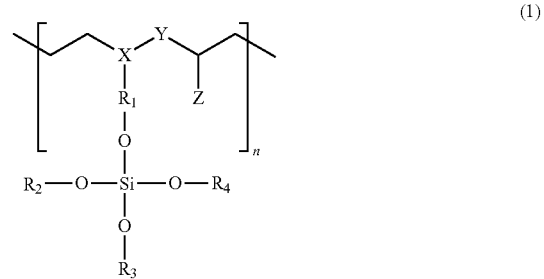

(1)

wherein $R_1$ to $R_4$ are independently hydrogen or linear or branched $C_1$-$C_{10}$ alkyl, n is an integer from 1 to 50, and X, Y and Z are independently an acrylate monomer of Formula 4:

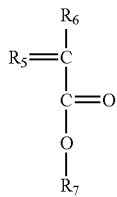

(4)

wherein $R_5$ to $R_7$ are independently hydrogen, $C_1$-$C_{10}$ alkyl or $C_1$-$C_{10}$ hydroxyalkyl, to damaged portions of the concrete structure to penetrate into the concrete.

In Formula 4, at least one of X, Y and Z is preferably an acrylate monomer substituted with hydroxyalkyl.

For example, the method including step (a) can be employed to repair an aged reinforced concrete structure in a relatively good state (aging grade I).

The repair method of the present invention may further include the step of (b) filling cavities formed in the concrete with a repair mortar. For example, a reinforced concrete structure of aging grade II, i.e., with low strength and high carbonation depth without any corrosion of the reinforcing bars, can be repaired by sequentially carrying out steps (a) and (b).

The repair method of the present invention may further include the step of (c) top coating the surface-penetration reinforcing agent on the surface of the filled mortar.

Step (c) can always be carried out as a final step of the repair method, irrespective of the aging grade of concrete structures. That is, a reinforced concrete structure of aging grade II can be repaired by sequentially carrying out steps (a), (b) and (c).

The repair method of the present invention may further include the step of (d) applying a corrosion inhibitor to the surface of the reinforcing bars. For example, reinforced concrete structures of aging grades III and IV, i.e. with corroded reinforcing bars and deteriorated durability, can be repaired by carrying out steps (d), (a), (b) and (c) in this order.

The surface-penetration reinforcing agent may further include a silicate polymer of Formula 2:

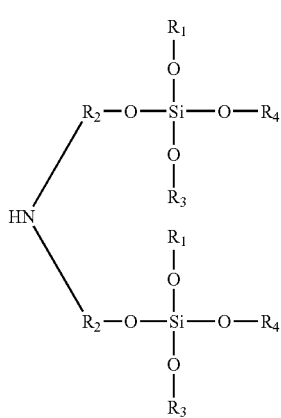

(2)

wherein each $R_1$ to $R_4$ are independently hydrogen or linear or branched $C_1$-$C_{10}$ alkyl.

The weight ratio of the silicate polymer of Formula 2 to the silicate polymer of Formula 1 may be 5-50:50-95.

The surface-penetration reinforcing agent may further include a silane compound substituted with one to four $C_1$-$C_{10}$ alkyl or alkoxy groups. The substituted silane compound may be used in an amount of 5 to 50 parts by weight and preferably 10 to 30 parts by weight, based on 100 parts by weight of the mixture of the silicate polymers. The substituted silane compound imparts water repellency to the final silicate polymer composition.

The surface-penetration reinforcing agent may further include 5 to 20 parts by weight of an alcoholic mixture consisting of 1 to 2% by weight of an indicator and 98 to 99% of a $C_1$-$C_5$ lower alcohol, preferably ethanol, based on 100 parts by weight of the mixture of the silicate polymers and the substituted silane compound.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

The present invention will now be described in more detail.

The present invention provides a method for repairing an aged reinforced concrete structure, the method including the step of (a) applying a surface-penetration reinforcing agent including a silicate polymer of Formula 1:

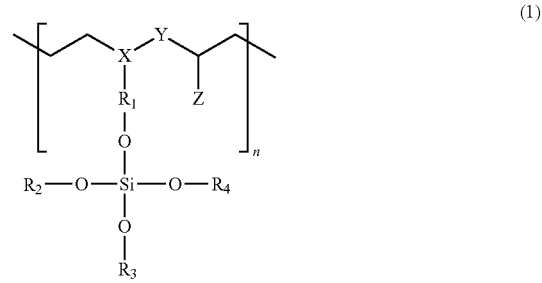

(1)

wherein $R_1$ to $R_4$ are independently hydrogen or linear or branched $C_1$-$C_{10}$ alkyl, n is an integer from 1 to 50, and X, Y and Z are independently an acrylate monomer of Formula 4:

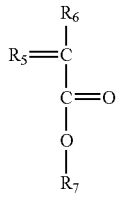

(4)

wherein $R_5$ to $R_7$ are independently hydrogen, $C_1$-$C_{10}$ alkyl or $C_1$-$C_{10}$ hydroxyalkyl, to damaged portions of the concrete structure to penetrate into the concrete.

For example, the method including step (a) can be employed to repair an aged reinforced concrete structure in a relatively good state (aging grade I).

Figure 1:
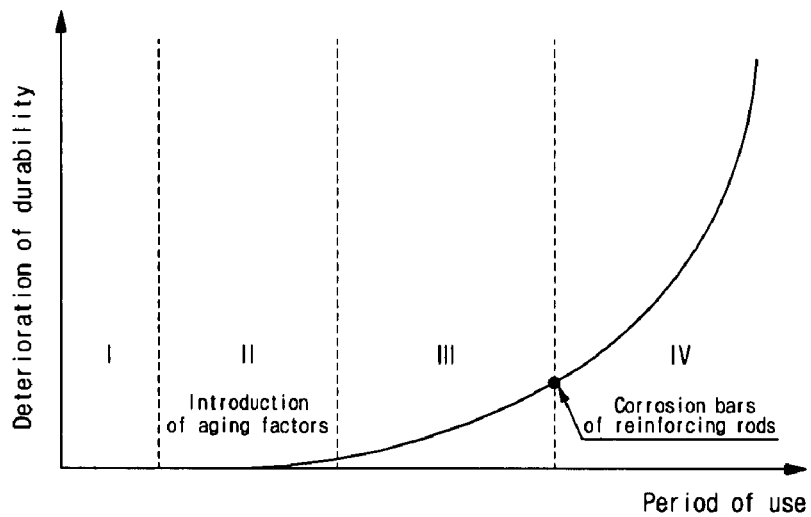
FIG. 1 is a graph showing four grades of aged reinforced concrete structures classified by the introduction of aging factors and the degree of corrosion of reinforcing bars.

Aged reinforced concrete structures to be repaired can be classified into four aging grades depending on the degree of introduction of chloride ions, the degree of carbonation and how much the reinforcing bars are corroded, based on the criteria indicated in TABLE 1 and FIG. 1. These four aging grades are graphically illustrated in TABLE 1.

TABLE 1

| Aging grade | Aged states of concrete structures | |
|---|---|---|
| I | Good state<br>Slight carbonation<br>(carbonation depth: 1-2 mm) | Occurrence of surface whitening or discoloration |
| II | Reduction of strength<br>Carbonation | Introduction of chloride ions<br>No corrosion of reinforcing bars observed |
| III | Reduction of strength<br>Carbonation | Introduction of chloride ions<br>Possible corrosion of reinforcing bars |
| IV | Reduction of strength<br>Carbonation | Introduction of chloride ions<br>Corrosion of reinforcing bars and reduction of load carrying capacity |

Figure 2:
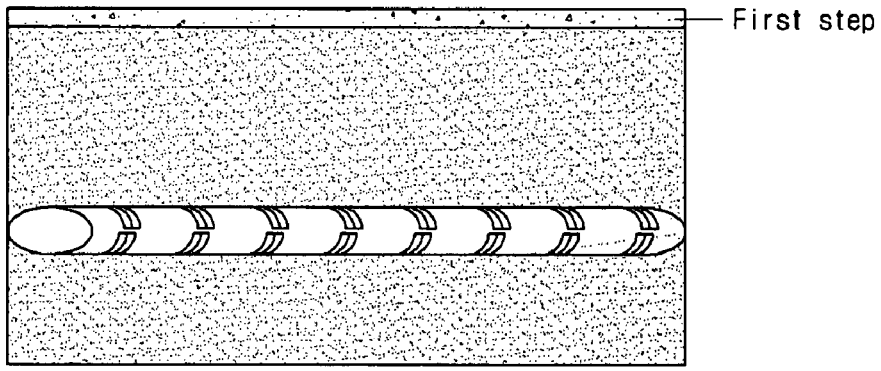
FIG. 2 is a schematic cross-sectional view of an aged reinforced concrete structure (aging grade I) repaired using a surface-penetration reinforcing agent.

FIG. 2 is a schematic cross-sectional view of an aged reinforced concrete structure (aging grade I) repaired by the method of the present invention. Specifically, the aging grade I of a reinforced concrete structure refers to a relatively good state in which slight surface whitening or discoloration occurs without severe carbonation, thus avoiding the need to recover the surface of the reinforced concrete structure. Further, since little or no corrosion of the reinforcing bars occurs, the aged reinforced concrete structure can be repaired in a simple manner by applying the surface-penetration reinforcing agent to the surface of the concrete structure (step (a)) without the necessity of carrying out the steps of applying a corrosion inhibitor to the surface of the reinforcing bars (step (d)), filling cavities formed in the concrete with a repair mortar (step (b)) and top coating the surface-penetration reinforcing agent on the surface of the filled mortar (step (c)). More specifically, the repair of a reinforced concrete structure of aging grade I is completed through the following steps: removal of damaged portions of the concrete, cleaning with high-pressure water, and application of the surface-penetration reinforcing agent two or more times using a suitable tool, such as a brush, roller or sprayer.

The repair method of the present invention may further include the step of (c) top coating the surface-penetration reinforcing agent on the surface of the filled mortar. Step (c) can be carried out to prevent additional damage to the repaired concrete structure after step (a).

Figure 3:
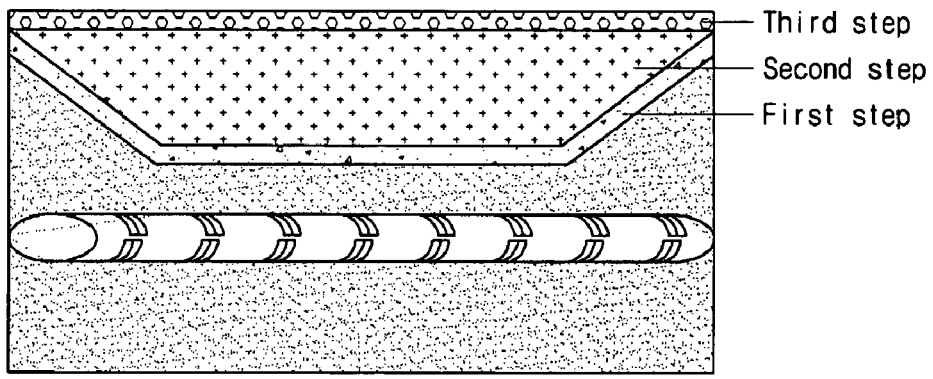
FIG. 3 is a schematic cross-sectional view of an aged reinforced concrete structure (aging grade II) repaired using a surface-penetration reinforcing agent.

The repair method of the present invention may further include the step of (b) filling cavities formed in the concrete with a repair mortar. For example, a reinforced concrete structure of aging grade II, i.e. with low strength and high carbonation depth without any corrosion of reinforcing bars, can be repaired by sequentially carrying out steps (a), (b) and (c). FIG. 3 is a schematic cross-sectional view of an aged reinforced concrete structure (aging grade II) repaired by the method of the present invention. The aging grade II of a reinforced concrete structure refers to a state in which chloride ions are introduced into the reinforced concrete structure and carbonation proceeds in the reinforced concrete structure to some extent, thus requiring the recovery of the surface of the reinforced concrete structure. There is no danger of corrosion of the reinforcing bars in the concrete structure of aging grade II, which eliminates the need for the application of a corrosion inhibitor to the reinforcing bars (step (d)). Specifically, the repair of a reinforced concrete structure of aging grade II is completed through the following steps: removal of damaged portions of the concrete, cleaning with high-pressure water, penetration of the surface-penetration reinforcing agent, filling of cavities formed in the concrete with a repair mortar, and top coating with the surface-penetration reinforcing agent.

Figure 4:
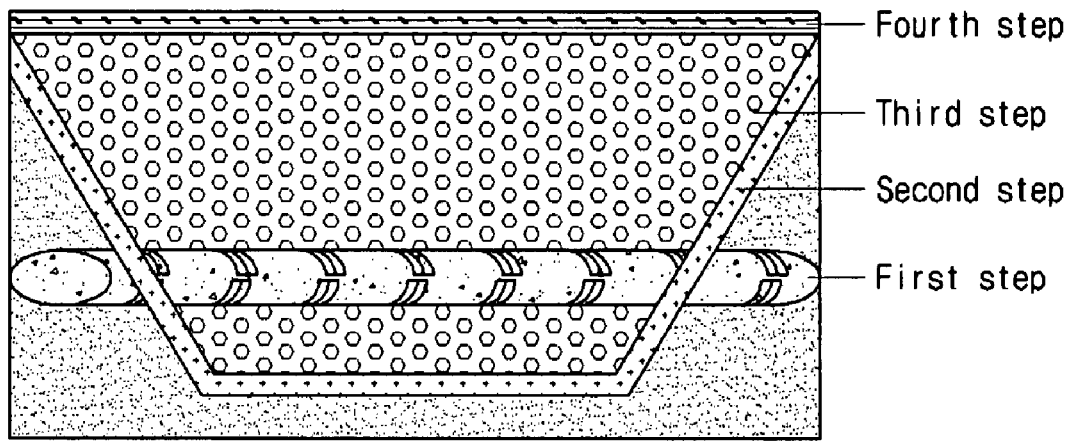
FIG. 4 is a schematic cross-sectional view of an aged reinforced concrete structure (aging grade III or IV) repaired using a surface-penetration reinforcing agent.

The repair method of the present invention may further include the step of (d) applying a corrosion inhibitor to the surface of the reinforcing bars. For example, reinforced concrete structures of aging grades III and IV, i.e. with corroded reinforcing bars and deteriorated durability, can be repaired by carrying out steps (d), (a), (b) and (c) in this order. FIG. 4 is a schematic cross-sectional view of an aged reinforced concrete structure (aging grade III or IV) repaired by the method of the present invention.

The aging grade III or IV of a reinforced concrete structure refer to a state in which chloride ions are introduced into the reinforced concrete structure and carbonation proceeds in the reinforced concrete structure to a large extent to cause possible corrosion or a risk of corrosion of the reinforcing bars, thus posing the danger of deterioration of durability. Specifically, the repair of reinforced concrete structures of aging grades III and IV is accomplished by carrying out all steps of the repair method, i.e. the steps of applying a corrosion inhibitor to the surface of the reinforcing bars, filling cavities in the concrete with a repair mortar, and top coating the surface-penetration reinforcing agent on the surface of the filled mortar. The aging grade III of a reinforced concrete structure refers to a state in which the strength of the reinforced concrete structure is reduced, chloride ions are introduced into the reinforced concrete structure, neutralization of the concrete occurs and there is a danger of corrosion of the reinforcing bars; and the aging grade IV of a reinforced concrete structure refers to a state in which the strength of the reinforced concrete structure is reduced, chloride ions are introduced into the reinforced concrete structure, neutralization of the concrete occurs and corrosion of the reinforcing bars occurs. More specifically, the repair of reinforced concrete structures of aging grades III and IV is completed through the following steps: removal of damaged portions of the concrete, application of a corrosion inhibitor to the surface of the reinforcing bars, cleaning with high-pressure water, penetration of the surface-penetration reinforcing agent, filling of cavities formed in the concrete with a repair mortar, and top coating with the surface-penetration reinforcing agent.

FIG. 4 is a schematic cross-sectional view of an aged concrete structure (aging grade III or IV) repaired by the method of the present invention. As shown in FIG. 4, a corrosion inhibitor is applied to the surface of a reinforcing bar using a brush (a first step); the surface-penetration reinforcing agent is applied using a brush or roller or by a spraying technique to penetrate into the concrete (a second step); a cavity formed in the concrete is filled with a repair mortar using a plasterer, a putty knife or a sprayer at a discharge pressure of 3-5 bar (a third step); and the surface-penetration reinforcing agent is top-coated on the surface of the filled mortar using a brush or roller or by a spraying technique (a fourth step).

The surface-penetration reinforcing agent is in a sol state when being applied to a damaged reinforced concrete structure, so that it can easily penetrate into pores of the damaged reinforced concrete structure and the repair mortar. Thereafter, the surface-penetration reinforcing agent reacts with hydrates of the cement and soluble alkaline substances by a sol-gel process to be converted into an insoluble gel state. This state conversion enables dense filling of the internal pores of the concrete to enhance the strength of the concrete and the repair mortar, inhibit the occurrence of whitening, enhance the adhesion of the concrete to the repair mortar, block the introduction of aging factors, and enhance the waterproofness, leading to prolonged endurance life and service life of the damaged reinforced concrete structure.

Any material that has turned out to be excellent in terms of its performance and effects and is commonly used in the art may be used as the corrosion inhibitor and the repair mortar to repair aged reinforced concrete structures. Examples of suitable corrosion inhibitors and repair mortar products include Remitar available from Hanil Cement Co., Ltd., Korea, self-stress mortar available from Dongbang Co., Ltd., Korea, high-performance fiber-reinforced concrete available from Hicon Engineering, Korea, and CTR (repair mortar product) available from Contech, Co., Ltd., Korea.

A more detailed explanation of the respective steps of the repair method according to the present invention will be given below.

In step (a), the surface-penetration reinforcing agent is applied to the surface of the concrete of an aged reinforced concrete structure to penetrate into the concrete. Any instrument, e.g., a brush, roller or sprayer, may be used to apply the surface-penetration reinforcing agent. For example, the surface-penetration reinforcing agent is sprayed at a pressure of 3-5 bar on a large-area aged concrete structure. At this time, the spraying is performed twice in such a manner that the spraying directions cross each other at right angles. Further, in the case where the surface of an aged reinforced concrete is highly water absorptive and has many pores, it is preferably to spray the surface-penetration reinforcing agent three or more times on the aged reinforced concrete.

In step (b), cavities of the concrete are filled with a repair mortar using a plasterer, a putty knife or a sprayer at a discharge pressure of 3-5 bar.

In step (c), the surface-penetration reinforcing agent is top-coated on the surface of the filled mortar using a brush or roller or by the spraying technique. In step (d), a corrosion inhibitor is applied to the surface of the reinforcing bars. The application of the corrosion inhibitor is performed in the same manner as in step (a).

Figure 5:
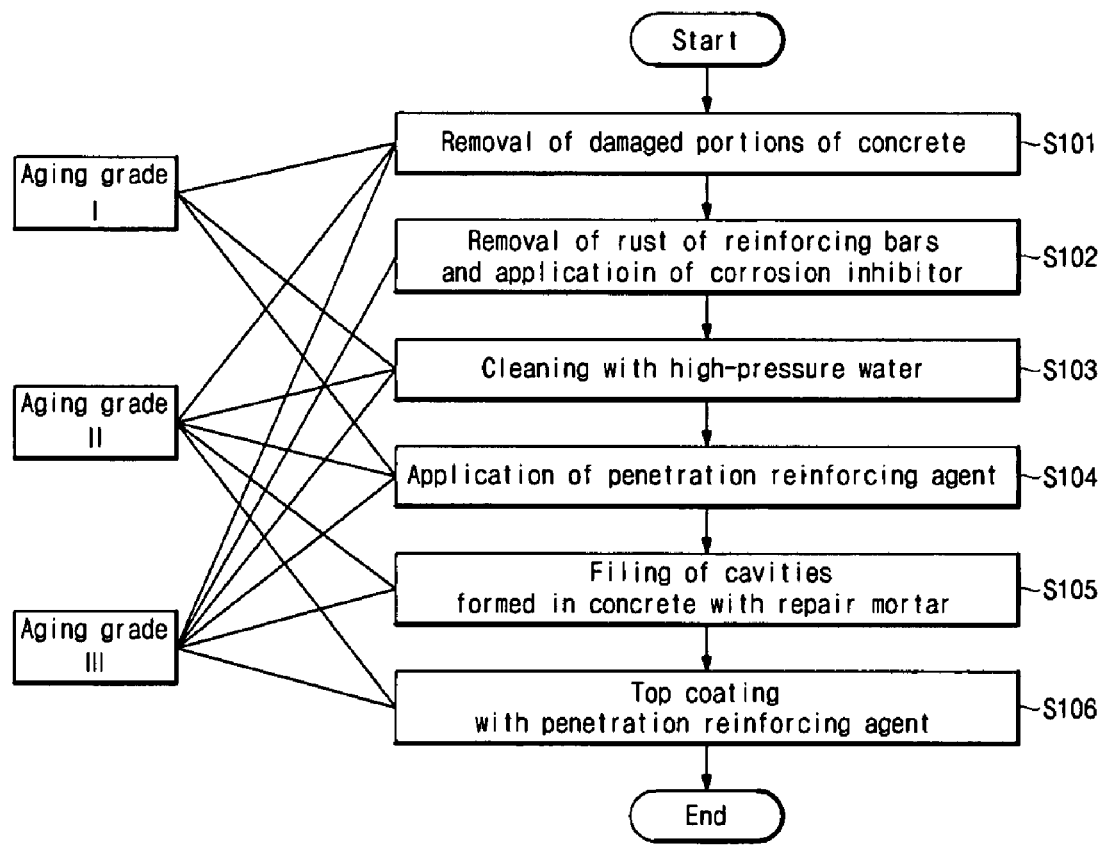
FIG. 5 illustrates process charts of a method for repairing reinforced concrete structures of different aging grades using a surface-penetration reinforcing agent in accordance with the present invention.

FIG. 5 illustrates process charts of the method for repairing reinforced concrete structures of different aging grades using the surface-penetration reinforcing agent in accordance with the present invention. The repair method of the present invention will be explained below based on the respective steps. First, damaged portions of the concrete of an aged reinforced concrete structure are removed (S101). Specifically, aged portions, whitened portions and discolored portions formed on the surface of the concrete are removed. The surface of a reinforced concrete structure of aging grade I is treated by grinding, water-jetting at 300-500 bar, sand-blasting at 7-7.5 bar, or spraying of a mixture of sand and water. The surface of a reinforced concrete structure of aging grade II, III or IV is treated using a drilling machine or by water-jetting at 500-1,200 bar.

Then, rust generated on the surface of the reinforcing bars is removed and a corrosion inhibitor is applied thereto (S102). This step is applied to reinforced concrete structures of aging grades III and IV. Specifically, rust is removed using a wire brush, by sand-blasting at 7-7.5 bar or by spraying of a mixture of sand and water, and then a corrosion inhibitor is applied to the rust-free surface of the reinforcing bars using a brush.

High-pressure water cleaning is performed (S103). This step is applied to all reinforced concrete structures irrespective of aging grades thereof. S103 is carried out after removal of damaged portions of the concrete. Alternatively, in the case where a corrosion inhibitor is applied to the surface of the reinforcing bars, S103 is carried out after the corrosion inhibitor is sufficiently cured. Specifically, a high-pressure water cleaner (100-300 bar) is used to remove impurities generated during removal of damaged portions of the concrete and substances impeding the penetration of the surface-penetration reinforcing agent.

The surface-penetration reinforcing agent, which is used to repair reinforced concrete structures of various aging grades, is applied using a brush or roller or by a spraying technique at a pressure of 3-5 bar. In the case of a reinforced concrete structure of aging grade I, the surface-penetration reinforcing agent is used as a top coat layer of the aged reinforced concrete structure (S104). In the case of a reinforced concrete structure of aging grade II, III or IV, the surface-penetration reinforcing agent is used as a primer layer to which a repair mortar is adhered (S104). The surface-penetration reinforcing agent used as the top layer penetrates into the concrete to enhance the strength of the concrete, inhibit the occurrence of whitening and inhibit the introduction of aging factors into the concrete from the outside. The use of the surface-penetration reinforcing agent as the primer layer enhances the strength of the concrete, inhibits the occurrence of whitening and enhances the adhesion to a repair mortar.

After completion of S104, cavities formed in the concrete are filled with a repair mortar (S105). S105 is applied to reinforced concrete structures of aging grades of II, III and IV. Specifically, the cavities formed in the concrete are filled with a repair mortar using a plasterer, a putty knife, or a dry or wet sprayer at a discharge pressure of 3-5 bar. Any material that has turned out to be excellent in terms of its performance and effects and can be readily used by any person may be used as the repair mortar.

As a final step, the surface-penetration reinforcing agent is top-coated on reinforced concrete structures of aging grades II, III and IV (S106). Specifically, the penetration reinforcing agent is applied to the surface of the filled mortar. The repair mortar must be cured for a minimum of three days before the application of the surface-penetration reinforcing agent to the surface of the filled mortar. If the repair mortar is insufficiently cured, moisture present in the internal capillary pores of the repair mortar becomes an obstacle to the penetration of the surface-penetration reinforcing agent.

In an embodiment of the present invention, there is provided a method for repairing a damaged reinforced concrete structure, the method including the steps of: removing damaged portions of the concrete and identifying whether or not the reinforcing bars are exposed and corroded due to the damage of the concrete; removing rust of the reinforcing bars and applying a corrosion inhibitor thereto if the corrosion of the reinforcing bars is identified; applying the surface-penetration reinforcing agent to the damaged portions of the concrete to penetrate the surface-penetration reinforcing agent into the concrete; determining whether or not it is necessary to recover the surface of the concrete due to the introduction of chloride ions into the damaged portions of the concrete and the carbonation of the concrete; and filling cavities formed in the concrete with a repair mortar and top coating the filled mortar with the surface-penetration reinforcing agent if the surface recovery is determined to be necessary.

The surface-penetration reinforcing agent including the silicate polymer of Formula 1 used in the method of the present invention can be prepared by reacting a silicate of Formula 3:

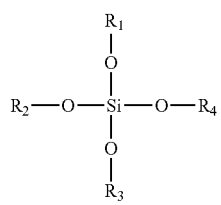

(3)

wherein $R_1$ to $R_4$ are independently hydrogen or linear or branched $C_1$-$C_{10}$ alkyl, with an acrylate monomer of Formula 4:

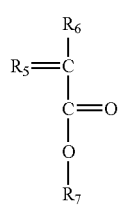

(4)

wherein $R_5$ to $R_7$ are independently hydrogen, $C_1$-$C_{10}$ alkyl or $C_1$-$C_{10}$ hydroxyalkyl.

An exemplary reaction is depicted in Reaction 1 below.

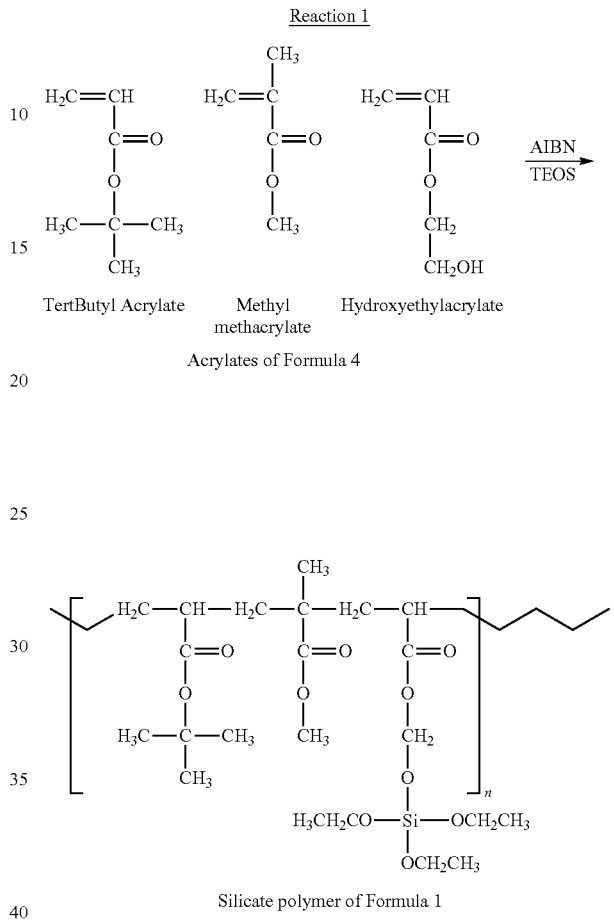

Acrylate monomers that can be represented by Formula 4 may be used alone or as a mixture of two or more thereof, with the proviso that at least one acrylate monomer have a hydroxyl group.

A reaction catalyst can be used for the reaction. Preferable reaction catalysts are polymerization catalysts that are dissolved in the silicate compound of Formula 3, and examples thereof include azobisisobutyronitrile (AIBN) and benzoyl peroxide (BPO). The reaction catalyst is added in an amount of 0.1 to 10% by weight with respect to the total weight of the reactants.

Specifically, the silicate polymer of Formula 1 is prepared in accordance with the following procedure. First, the silicate of Formula 3, one or more acrylate monomers of Formula 4 and the reaction catalyst are added to a reactor. Then, the reaction materials are stirred at 30-100 rpm while introducing nitrogen gas into the reactor. The reaction materials are allowed to react while maintaining the internal temperature of the reactor at 60-100° C. The reaction is quenched when the molar number of an alcohol initially released from the reaction by-products from the reaction mixture and condensed in a condenser reaches 85% of that of the monomer having a hydroxyl (—OH) group. After completion of the reaction, the reaction mixture is cooled below 40° C.

The surface-penetration reinforcing agent may further include a silicate polymer of Formula 2:

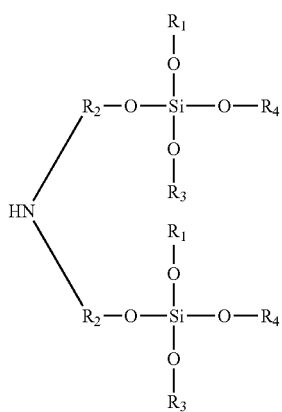 (2)

wherein each $R_1$ to $R_4$ are independently hydrogen or linear or branched $C_1$-$C_{10}$ alkyl.

The weight ratio of the silicate polymer of Formula 2 to the silicate polymer of Formula 1 is 5-50:50-95.

The silicate polymer of Formula 2 can be prepared by reacting the silicate of Formula 3 with an amine of Formula 5:

$$HN(R)_2 \quad (5)$$

wherein R is $C_1$-$C_{10}$ hydroxyalkyl.

An exemplary reaction is depicted in Reaction 2 below:

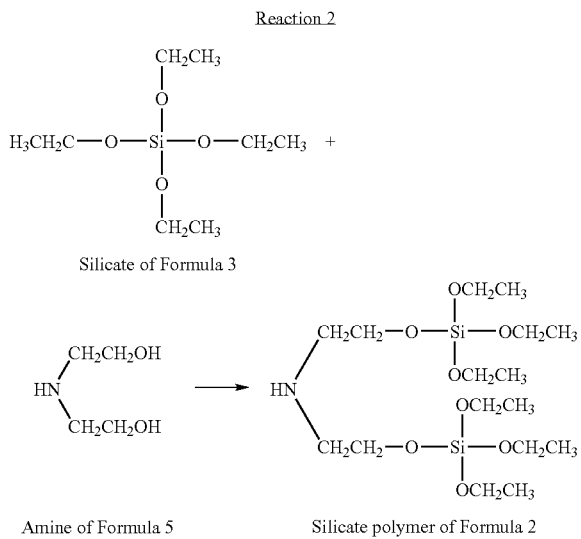

Specifically, the silicate polymer of Formula 2 is prepared in accordance with the following procedure. First, the silicate of Formula 3, the amine of Formula 5 and a reaction catalyst are added to a reactor. Then, nitrogen gas is introduced into the reactor. The reaction materials are allowed to react while maintaining the internal temperature of the reactor at 60-100° C. The introduction of the nitrogen gas is stopped when the amount of an alcohol initially released from the reaction by-products is less than 20% of that of the reaction by-products or no alcohol is released. After completion of the reaction, the reaction mixture is cooled below 40° C.

In a further embodiment of the present invention, the surface-penetration reinforcing agent may be a mixture of the silicate polymer of Formula 1 and the silicate polymer of Formula 2. The mixture of the silicate polymers can be obtained by mixing the silicate polymer of Formula 2 with the silicate polymer of Formula 1 in a weight ratio of 50-95:5-50 and preferably 70-90:10-30 and stirring the mixture at a rate of 30-100 rpm and preferably 40-80 rpm for 10-60 minutes and preferably 20-40 minutes. Calcium hydroxide present within the concrete acts as a catalyst to allow the silicate polymer of Formula 1 having an alkoxy group (e.g., a methoxy or ethoxy group) to release alcohol molecules, so that the surface-penetration reinforcing agent is converted into a gel state. As a result, the surface-penetration reinforcing agent is naturally in the form of an organic/inorganic composite, and exhibits water repellency due to the presence of the functional groups (e.g., alkyl), in the silicate polymer of Formula 1, unlike conventional reinforcing agents. Further, the amine group present in the silicate polymer of Formula 2 allows the surface-penetration reinforcing agent to penetrate into the concrete that is already neutralized or under neutralization. This penetration of the surface-penetration reinforcing agent causes curing of the concrete and makes the concrete alkaline to inhibit the neutralization of the concrete. As a result, the corrosion of the reinforcing bars is inhibited.

When the silicate polymer of Formula 2 is added in an amount of less than 5% by weight, its addition effects are not exhibited. Meanwhile, when the silicate polymer of Formula 2 is added in an amount of more than 50% by weight, the intended performance and effects of the silicate polymer of Formula 1 cannot be attained.

The surface-penetration reinforcing agent may further include a substituted silane compound. The substituted silane compound may be used in an amount of 5 to 50 parts by weight and preferably 10 to 30 parts by weight, based on 100 parts by weight of the mixture of the silicate polymers. The substituted silane compound imparts water repellency to the final silicate polymer composition.

The substituted silane compound may be an alkylalkoxysilane. It is preferred to mix the substituted silane compound with the silicate polymers and stir the mixture at a rate of 40-80 rpm for 20-40 minutes. The silane compound is added to enhance the water repellency of the silicate polymer composition. When the silane compound is used in an amount of more than 50 parts by weight, the waterproof effects of the silicate polymers are negligible. Meanwhile, when the silane compound is used in an amount of less than 5 parts by weight, no water repellency enhancing effect is expected.

The surface-penetration reinforcing agent may further include 5 to 20 parts by weight of an alcoholic mixture consisting of 1 to 2% by weight of an indicator and 98 to 99% of a $C_1$-$C_5$ lower alcohol, preferably ethanol, based on 100 parts by weight of the mixture of the silicate polymers and the substituted silane compound. Examples of suitable lower alcohols include methanol, ethanol and propanol. Particularly preferred is ethanol having a purity of 95% or higher. The alcohol present in the alcoholic mixture serves to effectively increase the penetrative force of the surface-penetration reinforcing agent and the indicator serves to show the penetration depth of the surface-penetration reinforcing agent. The indicator is used in such an amount that a color can be produced in response to pH variation. The indicator is preferably a base indicator because concrete has a high alkalinity of pH 12.5 due to the presence of calcium hydroxide in cement hydrates. Phenolphthalein is used as the indicator. Phenolphthalein becomes pink to red in color in an alkaline solution with pH greater than 8.2-10. When the content of the alcoholic mixture is less than 5 parts by weight, no reduction in the surface tension of the surface-penetration reinforcing agent occurs. Meanwhile, when the content of the alcoholic mixture exceeds 20 parts by weight, a change in the surface tension of the surface-penetration reinforcing agent is trivial.

In another embodiment of the present invention, the surface-penetration reinforcing agent may be prepared through the following steps: reacting the silicate compound of Formula 3 with the acrylate monomer of Formula 4 to prepare the silicate polymer of Formula 1; reacting the silicate of Formula 3 with the amine of Formula 5 to prepare the silicate polymer of Formula 2; mixing the silicate polymer of Formula 1 with the silicate polymer of Formula 2; adding an alkylalkoxysilane to the mixture of the silicate polymers of Formulae 1 and 2; and adding an alcohol containing an indicator to the mixture of the silane and the silicate polymers of Formulae 1 and 2. The step of mixing the silicate polymer of Formula 1 with the silicate polymer of Formula 2 may be omitted.

As the silicate compound of Formula 3, there may be used a substituted or unsubstituted $C_2$-$C_{20}$ alkyl silicate or alkylalkoxy silicate. Examples of such silicate compounds include tetraethylorthosilicate, tetramethylorthosilicate, trimethylmethoxyorthosilicate, trimethylethoxyorthosilicate, dimethyldimethoxyorthosilicate, dimethyldiethoxyorthosilicate, methyltrimethoxyorthosilicate, methyltriethoxyorthosilicate, tetramethoxyorthosilicate, tetraethoxyorthosilicate, methyldimethoxyorthosilicate, methyldiethoxyorthosilicate, dimethylethoxyorthosilicate, dimethylvinylmethoxyorthosilicate, dimethylvinylethoxyorthosilicate, methylvinyldimethoxyorthosilicate, methylvinyldiethoxyorthosilicate, diphenyldimethoxyorthosilicate, diphenyldiethoxyorthosilicate, phenyltrimethoxyorthosilicate, phenyltriethoxyorthosilicate, octadecyltrimethoxyorthosilicate, and octadecyltriethoxyorthosilicate. These silicate compounds may be used alone or as a mixture of two or more thereof.

The acrylate monomer of Formula 4 may be selected from the group consisting of tert-butyl acrylate, methyl methacrylate, hydroxyethyl acrylate, and mixtures thereof.

The amine compound of Formula 5 may be a $C_1$-$C_{10}$ alcohol amine. Diethanolamine is preferred.

The silane compound may be selected from the group consisting of isobutyltriethoxysilane, isobutyltrimethoxysilane, n-octyltriethoxysilane, and mixtures thereof.

All catalysts that are used for the polymerization of the respective reactants can be used as the reaction catalysts.

The present invention will be explained in more detail with reference to the following examples. However, these examples are given for the purpose of illustration only and are not to be construed as limiting the scope of the invention.

EXAMPLES

Example 1

Preparation of Surface-Penetration Reinforcing Agent

1) Preparation of Silicate Polymer of Formula 1

60% by weight of tetraethylorthosilicate, 28.3% by weight of butyl acrylate, 9.7% by weight of methyl methacrylate and 2% by weight of hydroxyethyl acrylate were added to a polymerization reactor, and α,α'-azobisisobutyronitrile (AIBN) as an initiator was added thereto. The mixture was allowed to react with stirring at 60 rpm for 8 hours while maintaining the temperature of the reactor at 80° C. The reaction mixture was cooled to room temperature to give the silicate polymer of Formula 1.

2) Preparation of Silicate Polymer of Formula 2

85% by weight of tetraethylorthosilicate, 14.17% by weight of diethanolamine and 0.83% by weight of p-toluenesulfonic acid were added to a reactor. The mixture was allowed to react with stirring at 60 rpm for 8 hours while maintaining the temperature of the reactor at 85° C. The reaction mixture was cooled to room temperature to give the silicate polymer of Formula 2.

3) Mixing of Silicate Polymer of Formula 1 and Silicate Polymer of Formula 2

80% by weight of the silicate polymer of Formula 1 prepared in step 1) and 20% by weight of the silicate polymer of Formula 2 prepared in step 2) were mixed together to give Composition C. The mixing was performed by stirring at 60 rpm for 30 minutes in a laboratory.

4) Addition of Silane Compound

8% by weight of isobutyltriethoxysilane, 7% by weight of isobutyltrimethoxysilane and 5% by weight of n-octyltriethoxysilane were added to 80% by weight of the silicate polymer prepared in step 3), followed by slow stirring for 10 minutes to give a surface-penetration reinforcing agent.

Experimental Example 1

Measurement of Physical Properties of the Surface-Penetration Reinforcing Agent

The viscosity of the surface-penetration reinforcing agent was measured using a single-cylinder rotational viscometer (Brookfield viscometer (DV-II+)) in accordance with KS F 3705. The viscosity measurement was done by measuring a torque necessary to constantly rotate a spindle immersed up to a marked line in the surface-penetration reinforcing agent. As a result, the surface-penetration reinforcing agent was measured to have a viscosity of 550 cps. The surface tension of the surface-penetration reinforcing agent was measured using a Du Nouy tensiometer, which is a general engineering tester. As a result, it was found that the surface-penetration reinforcing agent had a surface tension of 104 dyne/cm.

Example 2

The surface-penetration reinforcing agent prepared in Example 1 was stored and stabilized indoors at 23° C. for 24 hours. Separately, 1.1% by weight of phenolphthalein was slowly added dropwise to 98.9% by weight of ethanol (purity ≧95%) with stirring. Slow stirring was continued until the phenolphthalein was completely dissolved to obtain a colorless transparent composition. 50%, 30%, 20%, 10% and 5% by weight of the phenolphthalein-containing ethanolic solution were mixed with 50%, 70%, 80%, 90% and 95% by weight of the surface-penetration reinforcing agent prepared in Example 1, respectively. The resulting mixtures were slowly stirred for 10 minutes to prepare surface-penetration reinforcing agents.

Experimental Example 2

Measurement of Physical Properties of the Surface-Penetration Reinforcing Agents Prepared in Example 2

The viscosity and the surface tension of the surface-penetration reinforcing agents prepared in Example 2 were measured in the same manner as in Experimental Example 1. The results are shown in Table 2.

TABLE 2

| Surface-penetration reinforcing agent: ethanol (w/w) | Viscosity (cps) | Surface tension (dyne/cm) |
|---|---|---|
| 50:50 | 24 | 46 |
| 70:30 | 31 | 48 |
| 80:20 | 56 | 49 |
| 90:10 | 113 | 56 |
| 95:5 | 385 | 87 |

As can be seen from the results of Table 2, the viscosity and the surface tension of the surface-penetration reinforcing agents were decreased with increasing amount of the ethanolic composition. Further, the results of Table 2 reveal that there were small changes in viscosity and surface tension when the weight percent of the surface-penetration reinforcing agent prepared in Example 1 was not higher than 80%. Therefore, it is preferred that the ethanolic composition be in the range of 5 to 20% by weight.

Experimental Example 3

Repair of Damaged Reinforced Concrete Structure

20% by weight of ethanol was mixed with 80% by weight of the composition prepared in Example 1 to prepare a surface-penetration reinforcing agent. Trials were made using various filling mortar products, and as a result, best results were obtained when a filling mortar having the composition shown in Table 3 was used.

TABLE 3

Composition (wt %)

| Material | Content (wt %) | Product (Manufacturer) |
|---|---|---|
| Cement | 47.5 | Portland Cement (Hanil Cement Co., Ltd., Korea) |
| Silica | 50 | Jinsung Silica (Jinsung Mineral & Trading Co., Ltd., Korea) |
| Acrylic powder resin | 1.0 | Acrylate (Basf Korea) |
| Fumed silica | 1.0 | Product from the Republic of South Africa |
| Superplasticizer | 0.5 | Polycarbonate (Chemicon Co., Ltd., Korea) |

The surface-penetration reinforcing agent and the filling mortar were used to repair a damaged reinforced concrete structure.

In this Example, a bridge structure on a local road was used as the damaged reinforced concrete structure. The bridge structure was scheduled to be dismantled because corrosion of the reinforcing bars was accelerated due to freezing/melting and chlorides contained in snow removal agents.

First, damaged portions of the concrete were removed using a hammer and a chisel, and corroded portions of the reinforcing bars were treated by blasting. The bottom surfaces of the concrete were washed using a high-pressure washer. Thereafter, the surface-penetration reinforcing agent was applied in an amount of 1 liter/m$^2$ to the bottom surfaces of the concrete and a corrosion inhibitor was applied to the treated portions of the reinforcing bars. Then, the cavities of the concrete were filled with the repair mortar, followed by natural curing (standing in air) for 3 days. Finally, the surface-penetration reinforcing agent was applied in an amount of 1 liter/m$^2$ to the filled mortar.

Experimental Example 4

Identification of Performance of Repaired Reinforced Concrete Structure

Pull-Off Strength Test

The pull-off strength of the concrete was measured at a depth of 10 mm using a pull off tester specified in ASTM D 4541. As a result, the repaired concrete was measured to have a pull-off strength of 55.2 kg/cm$^2$, whereas the unrepaired concrete was measured to have a pull-off strength of 21.3 kg/cm$^2$. The repair was found to achieve a significant improvement in the strength of the concrete.

Water Absorption Rate Test

Cores having a diameter of 5 cm and a length of 10 cm were sampled from the surfaces of the concrete before and after the repair. All sides except the upper side of each of the cores were coated with epoxy. The water absorption rate test of the cores was conducted by analysis of water absorption ratio in accordance with KS F 2451. The core specimens, whose all sides except the upper side were coated, were completely immersed in a water bath at 20±2° C. The weight of the specimens before the water absorption was measured and the weight of the specimens were measured 24 hours after the water immersion. The water absorption ratio of the specimens was calculated by the following equation:

$$\text{Water absorption ratio} = \frac{\text{Amount of water absorbed in repaired concrete specimen}}{\text{Amount of water absorbed in unrepaired concrete specimen}}$$

Immediately after the water absorption rate test was finished, the test specimens were divided into equal parts. A reagent for measuring the water absorption depth was sprayed on the divided parts, and a vernier caliper was used to measure the water absorption depth, which was expressed in mm.

As a result of the test, 0.6 g of water was absorbed in the repaired concrete specimen while 12.4 g of water was absorbed in the unrepaired concrete specimen. Analysis indicates that the water absorption ratio was 0.05, which is within the range ($\leqq 0.1$) specified by KS F 4930 regarding waterproofing materials. Therefore, it was confirmed that the repaired concrete structure ensured sufficient waterproofness.

As mentioned above, the repair method of the present invention is distinguished from conventional repair methods in that repair of reinforced concrete structures can be performed stepwise depending on the aging degree of the reinforced concrete structures, which simplifies the repair procedure and is advantageous from the economical viewpoint. Further, according to the repair method of the present invention, the surface-penetration reinforcing agent deeply penetrates into concrete despite the simplified procedure to achieve secured repair of reinforced concrete structures. Therefore, the repair method of the present invention is an improved method over conventional repair methods associated with the formation of a film on the surface of concrete.

As apparent from the above description, the method for repairing an aged reinforced concrete structure according to the present invention solves the problems of conventional repair methods, for example, falling of primers due to low adhesive force after adhesion for a long time, lack of concrete reinforcement effects, peeling of top coating agents due to dissolution of whitening substances, loosening and falling of coating agents due to poor water vapor permeability, and potential explosiveness inherent to coating agents. Further, according to the repair method of the present invention, aged reinforced concrete structures are repaired depending on their aging grade. Therefore, the repair method of the present invention is highly consistent with the purposes of repair work and has advantages in that the time and material costs required for the repair of aged reinforced concrete structures can be saved.

What is claimed is:

1. A method for repairing an aged reinforced concrete structure, the method comprising the step of (a) applying a surface-penetration reinforcing agent comprising a silicate polymer of Formula 1:

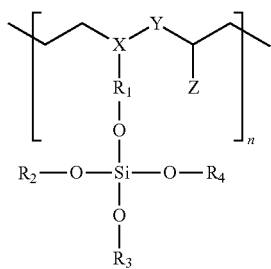

(1)

wherein $R_1$ to $R_4$ are independently hydrogen or linear or branched $C_1$-$C_{10}$ alkyl, n is an integer from 1 to 50, and X, Y and Z are independently an acrylate monomer of Formula 4:

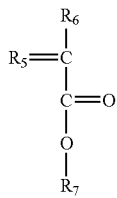

(4)

wherein $R_5$ to $R_7$ are independently hydrogen, $C_1$-$C_{10}$ alkyl or $C_1$-$C_{10}$ hydroxyalkyl, to damaged portions of the concrete structure to penetrate into the concrete.

2. The method according to claim 1, further comprising the step of (b) filling cavities formed in the concrete with a repair mortar.

3. The method according to claim 2, further comprising the step of (c) top coating the surface of the filled mortar with the surface-penetration reinforcing agent.

4. The method according to claim 3, further comprising the step of (d) applying a corrosion inhibitor to the surface of reinforcing bars in the concrete structure.

5. The method according to claim 1, wherein the surface-penetration reinforcing agent further comprises a silicate polymer of Formula 2:

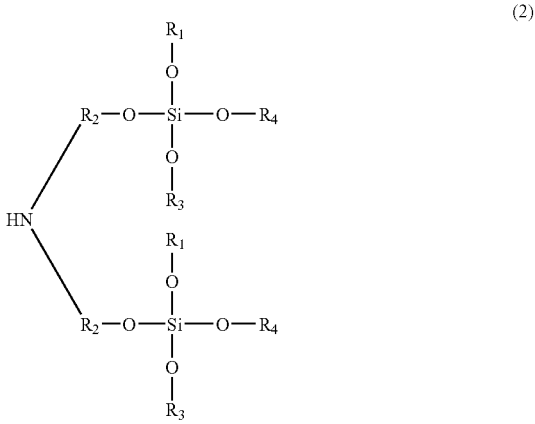

(2)

wherein each $R_1$ to $R_4$ are independently hydrogen or linear or branched $C_1$-$C_{10}$ alkyl, the weight ratio of the silicate polymer of Formula 2 to the silicate polymer of Formula 1 being 5-50:50-95.

6. The method according to claim 5, wherein the surface-penetration reinforcing agent further comprises 5 to 50 parts by weight of a silane compound substituted with one to four $C_1$-$C_{10}$ alkyl or alkoxy groups, based on 100 parts by weight of the mixture of the silicate polymers.

7. The method according to claim 6, wherein the surface-penetration reinforcing agent further comprises 5 to 20 parts by weight of an alcoholic mixture consisting of 1 to 2% by weight of an indicator and 98 to 99% of ethanol, based on 100 parts by weight of the mixture of the silicate polymers and the substituted silane compound.

8. The method according to claim 6, wherein the silane compound is selected from the group consisting of isobutyltriethoxysilane, isobutyltrimethoxysilane, n-octyltriethoxysilane, and mixtures thereof.

9. The method according to claim 5, wherein the silicate polymer of Formula 2 is prepared by reacting a silicate of Formula 3:

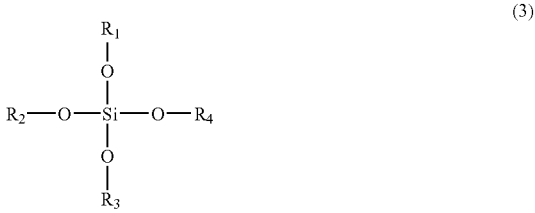

(3)

wherein $R_1$ to $R_4$ are independently hydrogen or linear or branched $C_1$-$C_{10}$ alkyl, with an amine of Formula 5:

$HN(R)_2$ (5)

wherein R is $C_1$-$C_{10}$ hydroxyalkyl.

10. The method according to claim 9, wherein the amine compound of Formula 5 is diethanolamine.

11. The method according to claim 9 wherein the silicate compound of Formula 3 is selected from the group consisting of tetraethylorthosilicate, tetramethylorthosilicate, trimethylmethoxyorthosilicate, trimethylethoxyorthosilicate, dimethyldimethoxyorthosilicate, dimethyldiethoxyorthosilicate, methyltrimethoxyorthosilicate, methyltriethoxyorthosilicate, tetramethoxyorthosilicate, tetraethoxyorthosilicate, methyldimethoxyorthosilicate, methyldiethoxyorthosilicate, dimethylethoxyorthosilicate, dimethylvinylmethoxyorthosilicate, dimethylvinylethoxyorthosilicate, methylvinyldimethoxyorthosilicate, methylvinyldiethoxyorthosilicate, diphenyldimethoxyorthosilicate, diphenyldiethoxyorthosilicate, phenyltrimethoxyorthosilicate, phenyltriethoxyorthosilicate, octadecyltrimethoxyorthosilicate, octadecyltriethoxyorthosilicate, and mixtures thereof.

12. The method according to claim 1, wherein the silicate polymer of Formula 1 is prepared by reacting a silicate of Formula 3:

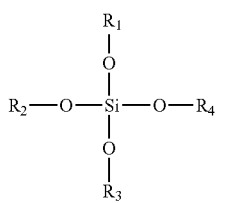

(3)

wherein $R_1$ to $R_4$ are independently hydrogen or linear or branched $C_1$-$C_{10}$ alkyl, with an acrylate monomer of Formula 4:

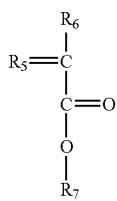

(4)

wherein $R_5$ to $R_7$ are independently hydrogen, $C_1$-$C_{10}$ alkyl or $C_1$-$C_{10}$ hydroxyalkyl.

13. The method according to claim 12 wherein the silicate compound of Formula 3 is selected from the group consisting of tetraethylorthosilicate, tetramethylorthosilicate, trimethylmethoxyorthosilicate, trimethylethoxyorthosilicate, dimethyldimethoxyorthosilicate, dimethyldiethoxyorthosilicate, methyltrimethoxyorthosilicate, methyltriethoxyorthosilicate, tetramethoxyorthosilicate, tetraethoxyorthosilicate, methyldimethoxyorthosilicate, methyldiethoxyorthosilicate, dimethylethoxyorthosilicate, dimethylvinylmethoxyorthosilicate, dimethylvinylethoxyorthosilicate, methylvinyldimethoxyorthosilicate, methylvinyldiethoxyorthosilicate, diphenyldimethoxyorthosilicate, diphenyldiethoxyorthosilicate, phenyltrimethoxyorthosilicate, phenyltriethoxyorthosilicate, octadecyltrimethoxyorthosilicate, octadecyltriethoxyorthosilicate, and mixtures thereof.

14. The method according to claim 12, wherein the acrylate monomer of Formula 4 is selected from the group consisting of tert-butyl acrylate, methyl methacrylate, hydroxyethyl acrylate, and mixtures thereof.

15. The method according to claim 1, wherein the method further comprises the steps of:
(d) applying a corrosion inhibitor to the surface of reinforcing bars within damaged portions of a damaged reinforced concrete structure;
(e) applying the surface-penetration reinforcing agent to the damaged portions of the concrete structure to penetrate into the concrete;
(f) filling cavities formed in the concrete with a repair mortar; and
(g) top coating the surface-penetration reinforcing agent on the surface of the filled mortar.

16. The method according to claim 1, wherein the method comprises the steps of:
removing damaged portions of the concrete and identifying whether or not reinforcing bars in the concrete structure are exposed and corroded due to the damage of the concrete;
removing rust from the reinforcing bars and applying a corrosion inhibitor thereto if the corrosion of the reinforcing bars is identified;
applying the surface-penetration reinforcing agent to the damaged portions of the concrete to penetrate the surface-penetration reinforcing agent into the concrete;
determining whether or not it is necessary to recover the surface of the concrete due to the introduction of chloride ions into the damaged portions of the concrete and the carbonation of the concrete; and
filling cavities formed in the concrete with a repair mortar and top coating the filled mortar with the surface-penetration reinforcing agent if the surface recovery is determined to be necessary.

* * * * *